May 26, 1970     J. C. FISK     3,513,601
GRINDING GAUGE
Filed Nov. 29, 1967     2 Sheets-Sheet 1
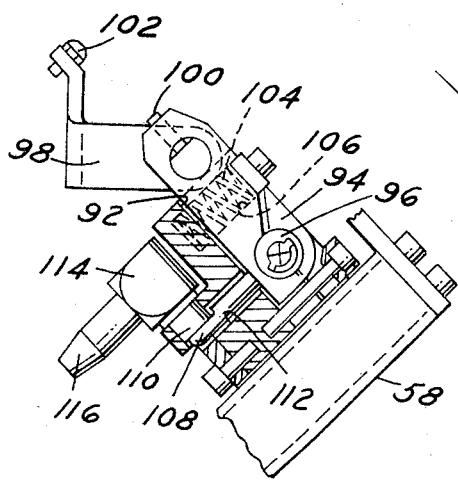
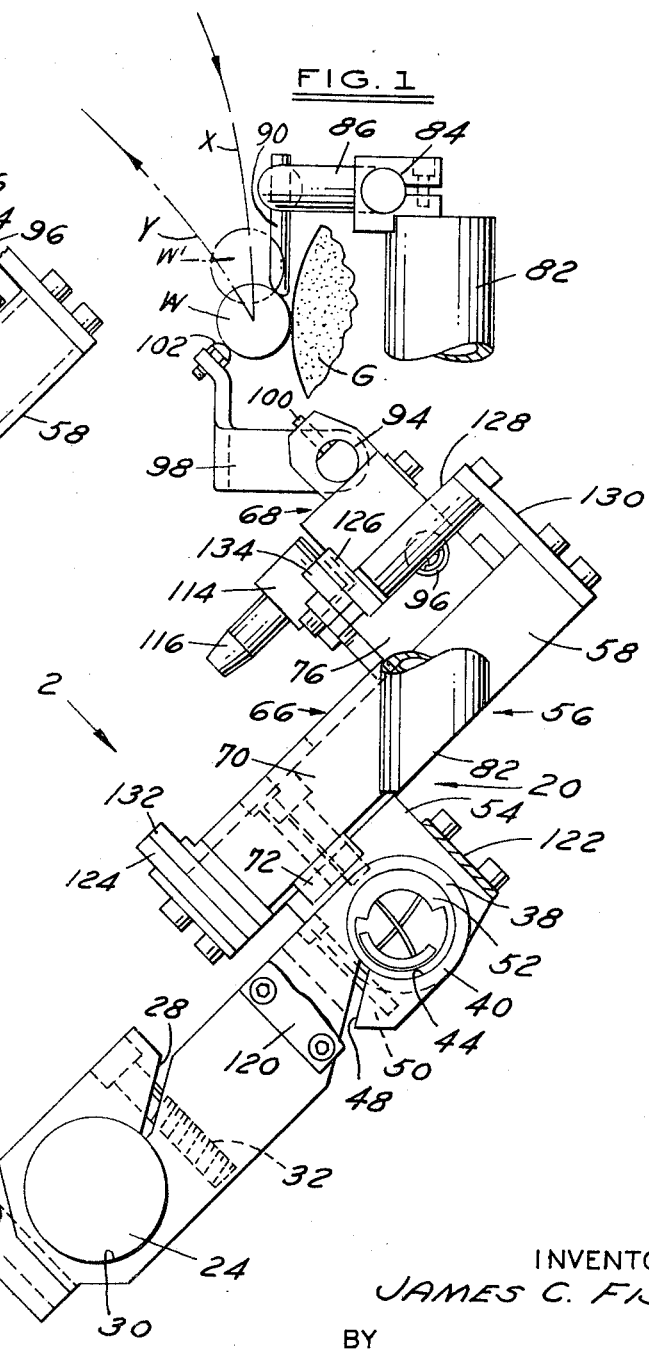
INVENTOR
JAMES C. FISK
BY
Burton & Parker
ATTORNEYS

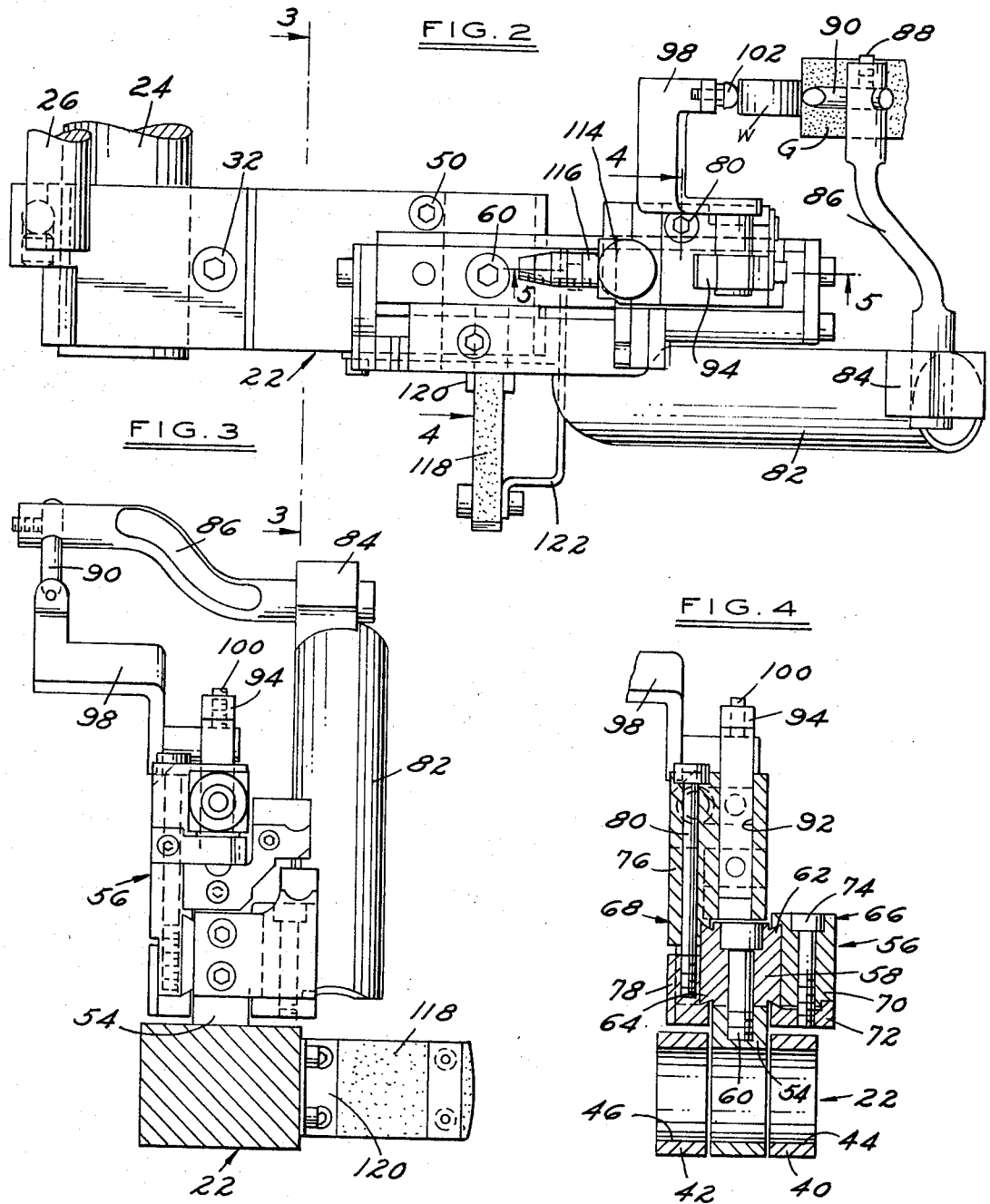

United States Patent Office 3,513,601
Patented May 26, 1970

3,513,601
GRINDING GAUGE
James C. Fisk, G-3219 E. Bristol Road,
Flint, Mich. 48507
Filed Nov. 29, 1967, Ser. No. 686,638
Int. Cl. B24b 49/00
U.S. Cl. 51—165                                                              10 Claims

ABSTRACT OF THE DISCLOSURE

A grinding gauge for fixed mounting on a grinding machine to effect a gauging function on a workpiece during the grinding operation and enabling loading and unloading successive workpieces to be ground without moving the gauge to permit entry and exit of workpieces, the gauge including a base fixed to the machine, a gauge body mounted on the base for limited pivotal movement with respect thereto, and a pair of workpiece engaging contacts mounted on the body, one such contact coupled to mechanism for sensing variations in the size of the workpiece. Advantageously the contacts are positioned one slightly above and one slightly below the line forming a common diameter of workpiece and grinding wheel, whereby the contact adjacent the grinding wheel clears the wheel when in grinding position, yet permits ingress and egress of workpieces along an essentially vertical path, without movement of the entire gauge when the grinding wheel is retracted from the workpiece.

---

Gauges heretofore employed to effect a similar gauging function have, for the most part, been mounted for movement on the grinding machine toward and away from the workpiece, the gauge being retracted while a finished workpiece was unloaded and a new one brought into position, then extended to contact the new workpiece during the grinding operation. A fairly common mechanism utilized to shift the gauge toward and away from the workpiece has been a fluid pressure operated piston-cylinder upon which the gauge is mounted. One problem encountered with gauge assemblies which must be shifted back and forth for each successive operation is the difficulty of maintaining sensitivity and fidelity of working parts in the extremely dirty, abrasive environment of the machine area where the actual grinding takes place. Another disadvantage is that the motive means employed to shift the gauge takes up appreciable space.

A further disadvantage of the previous movable gauge designs has been the loss of time. After each grinding operation, the gauge must be retracted, the finished workpiece removed, a new workpiece loaded, and the gauge then advanced, and during all of this time the grinding machine is standing idle. The provision of automatic loading and unloading mechanisms has appreciably reduced idle machine time. With sophisticated apparatus, the entire loading cycle may take only one-half second. Still, with conventional movable gauges, the time required to shift the gauge back and fourth adds greatly to the total time between grinding operations.

It is therefore an important object of the invention to provide a grinding gauge capable of fidelity of performance, which gauge is adapted to be mounted in fixed position on the grinding machine, the workpiece engaging contacts of the gauge being arranged to permit ingress and egress of workpieces without the necessity of shifting the entire gauge, and without danger of damage to the gauge during loading and unloading the workpieces.

Another object of the invention is the provision of a grinding gauge of the above character which is of sturdy construction, yet simpler in design than gauges heretofore available, and which is compact and so oriented that it does not interfere with the various grinding machine parts.

A further object of the invention is to provide a grinding gauge having the above-mentioned characteristics which is easily, conveniently and accurately adjustable to accommodate workpieces of various sizes, the gauge being provided with means for indicating the amount of adjustment of the gauge contacts so that adjustments may be effected with a minimum of effort and machine "down time."

Other objects, advantages, and meritorious features will more fully appear from the following specification, claims, and accompanying drawings, wherein:

FIG. 1 is a front elevation with parts broken away, showing a grinding gauge embodying my invention as it may be positioned during an actual grinding operation;

FIG. 2 is a top elevation of the gauge of FIG. 1, taken in the direction of the arrow 2 in FIG. 1;

FIG. 3 is a cross sectional view taken along line 3—3 of FIG. 2;

FIG. 4 is a cross sectional view taken substantially along line 4—4 of FIG. 2; and FIG. 5 is a cross sectional view, with some portions shown in solid outline for clarity, taken along line 5—5 of FIG. 2.

A gauge embodying my invention is indicated in FIG. 1 at 20, and includes a base 22 provided with means for fixedly securing the gauge to a grinding machine. In the illustrated embodiment, the grinding machine has a mounting post 24 and a torque post 26, both fixed to the machine, and the gauge base 22 is split as indicated at 28 and apertured at 30 to accommodate the post 24. A capscrew 32 is threaded into the base to clamp the gauge securely onto post 24 and thus retain the gauge assembly in position with respect to the grinding wheel. To maintain attitude of the gauge during adjustment axially along post 24 with screw 32 loosened, a pin 34 held by setscrew 36 engages torque post 26, preventing the base 22 from shifting about post 24 during its movement therealong.

The opposite end 38 of base 22 defines a clevis having arms 40 and 42 (see FIG. 4) which are provided with aligned apertures 44 and 46, and each of which are split as shown at 48 on arm 40 in FIG. 1. Capscrew 50 serves to clamp the clevis arms about a flexural pivot 52 extending through apertures 44 and 46 as more fully described hereinbelow. Projecting between arms 40 and 42 is a depending portion 54 of a gauge body shown generally at 56 which portion is similarly clamped to the flexural pivot 52. Surmounting the portion 54 is an elongate base member 58 secured thereto as by a bolt or the like 60 (FIG. 4). Such base member has opposite longitudinally extending edges forming dovetailed ways as shown at 62 and 64 in FIG. 4 for cooperative sliding engagement with other parts to be described. The gauge body 56 is limitedly pivotable with respect to base 22 through the flexural pivot 52, which comprises flat, crossed springs supporting rotating sleeves, as best seen in FIG. 1. Such pivots are commercially available, and the structure of the pivot 52 per se is thus not a part of the instant invention.

Mounted on opposite sides of body member 58 are contact carrying assemblies 66 and 68, each of which has portions formed for engagement with the ways 62 and 64 on body 58, permitting the assemblies to be slidably positioned with respect to the body. Each assembly includes a two-piece block with suitable cutouts to fit and form a dovetail joint with the body 58, the block pieces being secured together by a bolt or the like. For example, assembly 66 comprises an upper block 70 and a lower block 72, as shown in FIG. 4, secured together by a bolt 74 threaded into the lower block whereby upon tightening the bolt the assembly is clamped onto body 58 to hold it in position. Similarly, assembly 68 includes upper block 76 and lower block 78 held together with bolt 80. Loosening of the bolts permits the assemblies to be slid along body member 58 to vary the distance between the gauge contacts and thus provide a gauge that can accommodate workpieces of different sizes.

In the embodiment shown in the drawings, contact assembly 66 carries the reference or relatively stationary contact, while assembly 68 carries the sensitive or relatively movable contact. Assembly 66 therefore includes an elongate member 82 secured as by welding to block 70, and terminating at its projecting end in a clamping block 84 which carries an arm member 86. Projecting laterally through an aperture in arm 86 and secured therein by a setscrew 88 is reference contact 90, shown in FIG. 1 engaging a workpiece W held in grinding position contacting grinding wheel G of the grinding machine.

Block 76 of contact assembly 68 is provided with a vertically opening rectangular cutout 92 within which extends a member 94 pivotally mounted on the block 76 by means of a flexural pivot 96 similar in construction to pivot 52 previously described. Arm member 98 is secured to member 94 as by setscrew 100 and carries at its outer end a sensitive contact 102 positioned to engage a workpiece W at a point diametrically opposite reference contact 90. A coil spring 104 is disposed in a cylindrical recess 106 in block 76, which spring bears against member 94 to bias sensitive contact 102 into engagement with workpiece W.

Projecting laterally from the lower end portion of member 94 is a finger 108 having a flat upper surface 110 at its outer end, as shown most clearly in FIG. 5. Block 76 is apertured as at 112 to accommodate finger 108, and is threaded to accept a fitting 114 having a nipple portion 116 adapted to be coupled to a hose or the like connected to an air gauge device. Fitting 114 has an internal passage communicating with aperture 112 whereby movement of finger 108 in response to corresponding movement of sensitive contact 102 restricts air flow through the fitting passage to signal the air gauge device as more fully described herebelow. Of course, as will be apparent to those well skilled in the art, various types of sensing devices, mechanical, pneumatic or electronic, for example, could be utilized with the gauge embodying my invention, and it is understood that the invention is not limited in its application to any particular type of gauge indicator.

Because the gauge body 56 may have a tendency to oscillate on base 22 upon the body being pivoted on flexural pivot 52, it is desirable to interpose a damping means between the body and base to limit or check oscillation. Such a damping means is shown most clearly in FIGS. 2 and 3, and comprises a pad 118 of flexible material such as rubber or the like, one end of which is coupled to base 22 as by a bracket 120, and the other end of which is coupled to body portion 54 as by a similar bracket 122. As the gauge body is shifted with respect to the base during entry and exit of workpieces to and from the contacts of the gauge, the damping means is provided to arrest continued movement of the gauge body back and forth about the flexural pivot 52.

To each end of body slide 58 there is fixed a stop, such being shown at 124 and 126 respectively in FIG. 1. Stop 126 is secured to slide 58 through an arm 128 and an upright bracket 130, to dispose the stop in the proper position for the function described below. Block 70 of reference contact carrying assembly 66 has fixed thereto a similar stop 132 which is shown in abutment with stop 124 in FIG. 1, while block 76 of sensitive contact carrying assembly 68 has a stop 134 abutting stop 126. In this position of the contact carrying assemblies 66 and 68, the contacts 90 and 102 are at their limit of approach toward each other, and thus the workpiece W indicated in FIG. 1 is the smallest size workpiece that can be handled by the gauge. Movement of the contact assemblies along the body slide member 58 varies the distance between contacts 90 and 102, to accommodate workpieces of different sizes. As movement of each assembly causes corresponding movement of its respective stop, the distance between the stops of each pair is equal to the distance the contact has been moved. Thus by determining the distance between stops 124 and 132, the movement of contact 102 can be accurately determined, as can the movement of contact 90 by determining the distance between stops 126 and 134. The gauge may therefore be quickly and conveniently set to accommodate different size workpieces by shifting the assemblies 66 and 68, the correct positioning of the assemblies being easily determined by the distance between sets of stops 124, 132 and/or 126, 134.

Once the gauge 20 has been fixed in position on the grinding machine, as by sliding the gauge base over the machine post 24 and tightening screw 32, the gauge is connected to a suitable indicator to ready it for operation. In the embodiment shown, an air operated indicator is to be used, and the fitting nipple 116 is coupled by a suitable air line to the indicator (not shown). The gauge 20 is then positioned with respect to the grinding wheel G of the machine and the workpiece W as shown in FIG. 1.

As noted hereinabove, the reference contact 90 is relatively stationary with respect to the gauge body 56, while sensitive contact 102 is limitedly pivotable, being biased toward the contact 90 by spring 104 and flexural pivot 96. The entire body assembly 56 is biased in a counterclockwise direction, as seen in FIG. 1, about flexural pivot 52, and thus it can be seen that reference contact 90 is normally held in contact with workpiece W, by the spring action of pivot 52, while contact 102 is urged against the workpiece by spring 104 and pivot 96. As the contacts 90 and 102 are in contact with workpiece W at diametrically opposed points, the distance therebetween is equal to workpiece diameter.

Pressure air enters fitting 114 through nipple 116 and exits through the fitting orifice to impinge on the flat upper surface 110 of finger 108. As the grinding operation proceeeds, the sensitive contact assembly pivots about the axis of flexural pivots 96, which shifts surface 110 on finger 108 toward the air orifice of fitting 114, restricting the flow of pressure air from the orifice and creating a pressure differential, which is sensed by the remote indicator. When the proper workpiece diameter is reached, the grinding wheel W is backed away from workpiece W, or shifted to the right as shown in FIGS. 1 and 2 by means integral with the grinding machine.

It is of course to be understood that the workpiece W is not held in grinding position by the gauge contacts 90 and 102, but that the grinding machine has means which are not shown which maintain the workpiece in proper position in contact with the grinding wheel. In addition, the grinding machine may be, and preferably is, provided with automatic loading mechanism. Thus, at the completion of a grinding operation, the wheel G is backed away from workpiece W slightly, the finished workpiece is automatically removed from grinding position, another workpiece is automatically delivered and positioned properly between the gauge contacts, and the wheel G is shifted forward to its operative grinding position. Referring to FIG. 1, successive workpieces W are delivered to grinding position along the centerline designated X and finished workpieces are removed along centerline Y.

In FIG. 1 there is shown in phantom outline a workpiece $W^1$ being delivered by the automatic loading mechanism. As can be observed, when the workpiece $W^1$ approaches grinding position, there is interference between it and the arm of reference contact 90, and thus the contact assembly 56 and hence the contact assemblies 66 and 68 must move to permit entry of the workpiece. In the description above, it was observed that the gauge body were supported for limited pivotal movement with respect to gauge base 22 on flexural pivot 52. Therefore when a workpiece is delivered, it abuts contact 90, shifting the contact and the supporting assemblies slightly about pivot 52, thereby permitting entry of the workpiece to grinding position as shown at W in FIG. 1 without the necessity of moving the entire gauge 20 bodily away from its operative position, as was the case with prior gauges. The pivot 52 on which the gauge body and contact carrying assemblies 62 and 64 are mounted is parallel with the axis of workpiece W, and is located generally substantially beneath the workpiece axis. This pivotal, spring biased mounting of the gauge body assembly 56 and contact carrying assemblies 66 and 68 on the base 22 thus serves the dual functions of insuring intimate contact engagement with the workpiece and permitting entry and egress of workpieces without movement of the entire gauge. A further feature of the construction of the gauge is that the contacts 90 and 102 are so arranged that the workpiece $W^1$ strikes the reference contact 90, which is relatively rigid and fixed with respect to the gauge body, rather than the movable sensitive contact 102, obviating the possibility of damaging the latter, which is pivotally mounted and hence more susceptible to the shocks of repeated striking of workpieces thereagainst. The damping means 118 interconnected between base 22 and body 56 insures against oscillation of the body and contact assemblies during the workpiece loading operation.

As will be understood from the foregoing, the gauge described is capable of functioning in a fashion heretofore impossible with conventional gauges. Previous gauges of this general type have been mounted on a support for movement toward and away from the grinding wheel, in order to permit ingress and egress of workpieces. The features of my gauge obviate the necessity of moving the gauge after each grinding operation, and the gauge remains in position to perform its gauging function throughout the cycle of machine operation.

What is claimed is:

1. A gauge for measuring diameter of a workpiece while the workpiece is in contact with the grinding wheel of a machine, comprising a gauge body mounted for limited pivotal movement with respect to the machine, with the pivot axis being essentially parallel to and underneath the workpiece axis, a pair of gauging contacts mounted on said body in spaced apart relation for engaging a workpiece at diametrically opposite points, one of said contacts being movable with respect to the other in response to variation in workpiece diameter, with the diametral measuring line defining an acute angle with the coincident workpiece and grinding wheel diameters for permitting entry and exit of workpieces to and from grinding position between said gauging contacts without movement of the gauge on the machine, and sensing means coupled to said movable contact for sensing workpiece diameter variation.

2. The gauge as defined in claim 1 characterized in that said gauge includes a base having means for maintaining the gauge in fixed position on the grinding machine, said gauge body being mounted for limited pivotal movement on said base.

3. The gauge as defined in claim 2, characterized in that said gauge body is spring biased with respect to said base in a direction urging the contact opposite said movable contact toward a workpiece in grinding position.

4. The gauge as defined in claim 3, characterized in that said gauge body is positioned laterally offset and below the workpiece when in operative position, said gauging contacts being mounted on laterally extending offset arms connected to the gauge body.

5. The gauge as defined in claim 3, characterized in that damping means is interposed between said base and said gauge body for checking movement of the body about its pivotal connection with the base.

6. A grinding gauge for measuring the diameter of a workpiece while the workpiece is maintained in grinding position in a grinding machine, comprising a gauge body mounted for limited pivotal movement with respect to the grinding machine about an axis parallel to the axis of a workpiece being ground, said gauge body having an elongate portion defining a pair of ways along opposite longitudinal marginal edges thereof, contact carrying assemblies mounted on each of said ways for sliding movement therealong to accommodate workpieces having different diameters, one assembly including a reference contact fixed relative to such assembly and the other assembly including a sensitive contact mounted for limited pivotal movement relative to its assembly in a direction toward and away from said reference contact, said contacts positioned for workpiece engagement at diametrically opposite points.

7. The grinding gauge as defined in claim 6, characterized in that said elongate body portion and said assemblies are each provided with upstanding stops for limiting the movement of the assemblies along the ways in at least one direction of movement, and permitting accurate positioning of said assemblies along said ways by measurement of the distance between said stops.

8. The grinding gauge as defined in claim 6, characterized in that each contact carrying assembly is provided with locking means for fixing the assembly in any preselected position along its respective way.

9. The grinding gauge as defined in claim 8, characterized in that each contact carrying assembly includes a block member mounted for sliding movement along its respective way, and a laterally projecting arm mounted on said block member and carrying one of said contacts at its outer extremity, thereby disposing the gauge body and the block members mounted thereon spaced from the contacts and workpiece in a direction axially of said workpiece.

10. A gauge for measuring diameter of a workpiece while the workpiece is in contact with a grinding wheel, comprising a gauge body mounted for limited pivotal movement about an axis parallel to the axis of the workpiece being ground, a pair of contact carrying assemblies mounted on the body, one assembly including a reference contact fixed relative to such assembly and the other assembly including a sensitive contact mounted for movement in a direction toward and away from reference contact, said contacts positioned for workpiece engagement at diametrically opposite points, the diametral measuring line between said contacts defining an acute angle with the coincident workpiece and grinding wheel diameters and defining an acute angle with a line intersecting the gauge body and workpiece axes for permitting entry and exit of workpieces to and from grinding position without substantial movement of said gauge body, and sensing means coupled to said sensitive contact for sensing workpiece diameter variation.

References Cited

UNITED STATES PATENTS 1,768,931 7/1930 Pratt.
2,007,507 7/1935 Steiner.
2,464,387 3/1949 Foster _____ 51—165 X LESTER M. SWINGLE, Primary Examiner